United States Patent
Zhao

(10) Patent No.: US 12,156,246 B2
(45) Date of Patent: Nov. 26, 2024

(54) METHOD AND APPARATUS FOR CONTENDING FOR TIME-FREQUENCY RESOURCE FOR SIDELINK COMMUNICATION, AND TERMINAL

(71) Applicant: BEIJING XIAOMI MOBILE SOFTWARE CO., LTD., Beijing (CN)

(72) Inventor: Qun Zhao, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 542 days.

(21) Appl. No.: 17/284,233

(22) PCT Filed: Oct. 17, 2018

(86) PCT No.: PCT/CN2018/110666
§ 371 (c)(1),
(2) Date: Apr. 9, 2021

(87) PCT Pub. No.: WO2020/077568
PCT Pub. Date: Apr. 23, 2020

(65) Prior Publication Data
US 2021/0321449 A1    Oct. 14, 2021

(51) Int. Cl.
*H04W 74/00* (2009.01)
*H04W 24/08* (2009.01)
(Continued)

(52) U.S. Cl.
CPC ........ *H04W 74/002* (2013.01); *H04W 24/08* (2013.01); *H04W 72/02* (2013.01); *H04W 72/0446* (2013.01); *H04W 72/0453* (2013.01)

(58) Field of Classification Search
CPC . H04W 24/08; H04W 72/02; H04W 72/0446; H04W 72/0453; H04W 74/002;
(Continued)

(56) References Cited

U.S. PATENT DOCUMENTS 9,844,085 B2 * 12/2017 Seo .................... H04L 5/00
10,405,211 B2 * 9/2019 Li ...................... H04W 12/06
(Continued)

FOREIGN PATENT DOCUMENTS

CN    102056323 A    5/2011
CN    104602179 A    5/2015
(Continued)

OTHER PUBLICATIONS

Combined Chinese Office Action and Search Report issued Apr. 6, 2021 in Chinese Patent Application No. 201880001679.2 (with English translation), 17 pages.
(Continued)

*Primary Examiner* — Stephen J Clawson
(74) *Attorney, Agent, or Firm* — Oblon, McClelland, Maier & Neustadt, L.L.P.

(57) ABSTRACT

The disclosure relates to a method for contending for a time-frequency resource for sidelink communication. The method is performed by a terminal, and includes: determining a target time-frequency resource unit from n time-frequency resource units, and a contention resource group corresponding to the target time-frequency resource unit; sending a first contention signal on a first contention time-frequency resource unit in the contention resource group; and determining, based on a monitoring result on the contention resource group, whether contention for the target time-frequency resource unit is successful.

18 Claims, 10 Drawing Sheets

(51) Int. Cl.
*H04W 72/02* (2009.01)
*H04W 72/0446* (2023.01)
*H04W 72/0453* (2023.01)

(58) Field of Classification Search
CPC ... H04W 74/08; H04W 74/0808; H04W 4/40; H04W 76/14; H04W 92/18; H04W 72/40
See application file for complete search history.

(56) References Cited

U.S. PATENT DOCUMENTS

| | | | | |
|---|---|---|---|---|
| 2009/0086671 | A1* | 4/2009 | Pelletier | H04W 76/27 370/329 |
| 2009/0092086 | A1* | 4/2009 | Lee | H04L 5/006 455/452.2 |
| 2009/0135748 | A1* | 5/2009 | Lindoff | H04W 72/51 370/296 |
| 2011/0103320 | A1 | 5/2011 | You et al. | |
| 2015/0045018 | A1* | 2/2015 | Liu | H04W 76/14 455/426.1 |
| 2015/0195854 | A1* | 7/2015 | Zhu | H04W 72/23 370/329 |
| 2016/0044724 | A1* | 2/2016 | Seo | H04W 72/0446 370/329 |
| 2016/0112996 | A1* | 4/2016 | Ou | H04W 24/10 370/329 |
| 2016/0360396 | A1 | 12/2016 | Zhang | |
| 2017/0295567 | A1* | 10/2017 | Chen | H04W 4/70 |
| 2018/0077518 | A1* | 3/2018 | Nguyen | G08G 1/096791 |
| 2019/0037596 | A1* | 1/2019 | Liu | H04W 74/085 |

FOREIGN PATENT DOCUMENTS

| | | |
|---|---|---|
| CN | 105101300 A | 11/2015 |
| CN | 105101437 A | 11/2015 |
| CN | 106455115 A | 2/2017 |
| CN | 106559873 A | 4/2017 |

OTHER PUBLICATIONS

International Search Report and Written Opinion issued on Jul. 18, 2019 in PCT/CN2018/110666 filed on Oct. 17, 2018, 7 pages.

"On resource allocation of V2x communications," 3GPP TSG RAN WG1 Meeting #94bis, Xiaomi Communications, R1-1811422, 2018, 3 total pages.

* cited by examiner

METHOD AND APPARATUS FOR CONTENDING FOR TIME-FREQUENCY RESOURCE FOR SIDELINK COMMUNICATION, AND TERMINAL

CROSS-REFERENCE TO RELATED APPLICATIONS

This application is a national phase application based on PCT/CN2018/110666, filed on Oct. 17, 2018, the contents of which are incorporated herein by reference.

TECHNICAL FIELD

The present disclosure relates to the field of communication, in particular to a method, apparatus, device and system for contending for a time-frequency resource for sidelink communication.

BACKGROUND

With the continuous development of autonomous driving technology, people have higher and higher requirements for vehicle to everything (V2X) technology, so as to support the application of V2X. The cellular-based V2X (C-V2X) technology, which is formed based on the evolution of cellular network communication technologies such as 3G, 4G, and 5G, is suitable for communication between a vehicle-mounted device and user equipments located around a geographic position of a vehicle.

In a V2X sidelink communication system based on a long-term evolution (LTE) system, in order to avoid mutual interference when a plurality of nearby user equipments periodically send data, periodic resource reservation combined with a channel sensing technology is usually used to reduce the interference. User equipment A needs to acquire control information sent by other user equipment B, and predict time-frequency resources and interference used by the user equipment B for the next data transmission based on a transmission period, resource occupation and other information contained in the control information, thereby avoiding using time-frequency resources that have been pre-occupied by the user equipment B.

SUMMARY

This Summary is provided to introduce a selection of aspects of the present disclosure in a simplified form that are further described below in the Detailed Description. This Summary is not intended to identify key features or essential features of the claimed subject matter, nor is it intended to be used to limit the scope of the claimed subject matter.

Aspects of the disclosure provide a method, apparatus, device and system for contending for a time-frequency resource for sidelink communication, which can solve a problem that in the 5G NR system, the data sent by some V2X applications is non-periodically or randomly, and for these data, a user equipment A cannot predict the interference and collision of a user equipment B when the user equipment B sends data next time based on the data sent by the user equipment B last time. The technical solutions are as follows.

According to an aspect, a method for contending for a time-frequency resource for sidelink communication is provided. The method is performed by a terminal, and includes: determining a target time-frequency resource unit from n time-frequency resource units, n being a positive integer; determining a contention resource group corresponding to the target time-frequency resource unit, wherein a time-domain position of the contention resource group is earlier than a time-domain position of the target time-frequency resource unit, and the contention resource group includes at least two contention time-frequency resource units; sending a first contention signal on a first contention time-frequency resource unit in the contention resource group; monitoring other contention time-frequency resource units in the contention resource group except the first contention time-frequency resource unit; and determining, based on a monitoring result on the contention resource group, whether contention for the target time-frequency resource unit is successful.

According to another aspect, an apparatus for contending for time-frequency resources for sidelink communication is provided. The apparatus includes: a processor; and a memory for storing at least one instruction executable by the processor, wherein, when the at least one instruction is executed by the processor, the processor performs a method for contending for a time-frequency resource for sidelink communication, the method comprising: determining a target time-frequency resource unit from n time-frequency resource units, n being a positive integer; determining a contention resource group corresponding to the target time-frequency resource unit, wherein a time-domain position of the contention resource group is earlier than a time-domain position of the target time-frequency resource unit, and the contention resource group includes at least two contention time-frequency resource units; sending a first contention signal on a first contention time-frequency resource unit in the contention resource group; and monitoring other contention time-frequency resource units in the contention resource group except the first contention time-frequency resource unit; and determining, based on a monitoring result on the contention resource group, whether the contention for the target time-frequency resource unit is successful.

According to yet another aspect, a terminal is provided. The terminal includes: a processor; a transceiver communicably connected to the processor; and a memory configured to store at least one instruction executable by the processor, wherein, the processor, when loading and executing the at least one executable instruction, is caused to perform the above methods for contending for the time-frequency resource for sidelink communication.

According to yet another aspect, a computer-readable storage medium is provided. The storage medium stores at least one instruction, at least one program, at least one code set, or at least one instruction set, wherein the at least one instruction, the at least one program, the at least one code set, or the at least one instruction set, when loaded and executed by a processor of a terminal, causes the terminal to perform the above methods for contending for the time-frequency resource for sidelink communication.

It is to be understood that both the foregoing general description and the following detailed description are illustrative and explanatory only and are not restrictive of the present disclosure, as claimed.

BRIEF DESCRIPTION OF THE DRAWINGS

The accompanying drawings, which are incorporated in and constitute a part of the specification, illustrate aspects consistent with the present disclosure and, together with the description, serve to explain the principles of the present disclosure.

DETAILED DESCRIPTION

Reference will now be made in detail to exemplary aspects, examples of which are illustrated in the accompanying drawings. The following description refers to the accompanying drawings in which the same numbers in different drawings represent the same or similar elements unless otherwise represented. The implementations set forth in the following description of exemplary aspects do not represent all implementations consistent with the present disclosure. Instead, they are merely examples of apparatuses and methods consistent with aspects related to the present disclosure as recited in the appended claims.

Figure 1:
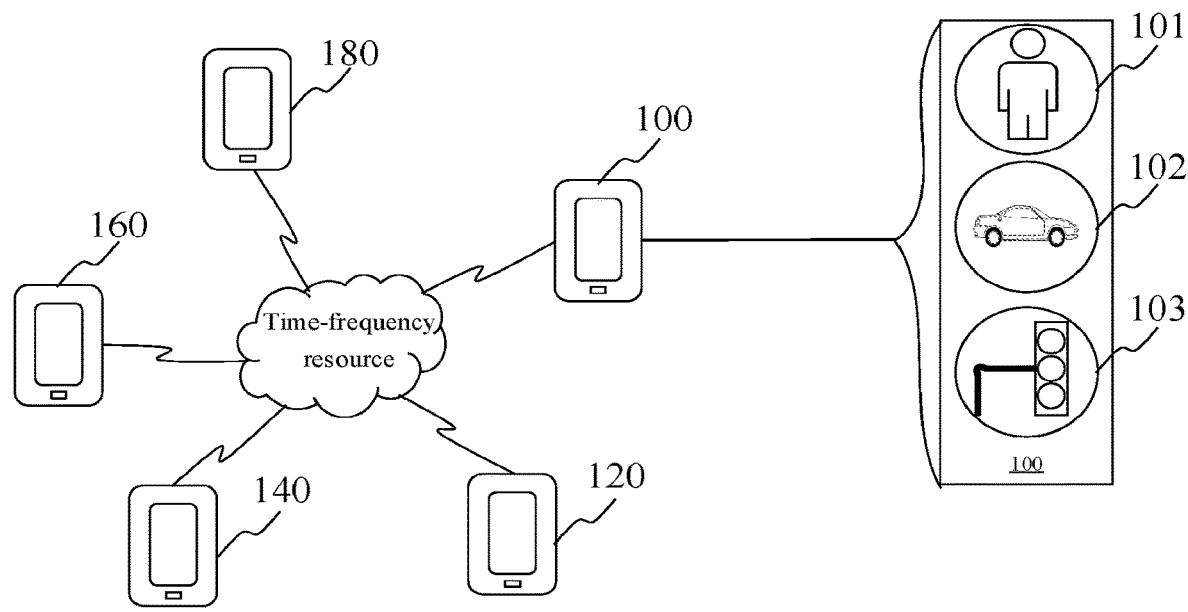
FIG. 1 is a schematic diagram of a communication system according to an exemplary aspect of the present disclosure.

FIG. 1 illustrates a schematic diagram of a communication system according to an exemplary aspect of the present disclosure. Sidelink communication may be applied to a communication system based on vehicle to everything (V2X). The communication system includes a terminal 100, a terminal 120, a terminal 140, a terminal 160, and a terminal 180.

In the communication system, the terminal 100, the terminal 120, the terminal 140, the terminal 160, and the terminal 180 are terminals which are close in geographic location. During data transmission, at least two terminals contend for a same time-frequency resource for data transmission. The number and types of the terminals will not be limited in aspects of the present disclosure.

Taking the terminal 100 as an example, the terminal 100 includes at least one of a pedestrian 101, a vehicle 102, and an infrastructure 103. The pedestrian 101 generally refers to an electronic device having a mobile communication capability carried by the pedestrian, such as a mobile phone and a wearable device, wherein the wearable device includes a smart bracelet, a smart watch, a smart ring or the like.

The vehicle 102 includes a vehicle having a communication function.

The infrastructure 103 includes all the infrastructures encountered during the driving of the vehicle, including building facilities such as traffic lights, bus stations, mansions and tunnels.

In many cases, sidelink communication is applied to a non-periodic data transmission scenario. Therefore, the aspects of the present disclosure provides a collision avoidance solution based on contention. Firstly, several terms involved in the aspects of the present disclosure are introduced in the following.

A time-frequency resource unit configured for data transmission: a time-domain unit and/or a frequency-domain unit configured to transmit sidelink communication data. During the sidelink communication, resource allocation is performed in a unit of time-frequency resource units. Exemplarily, one time-domain resource unit is one slot in the time domain, and one frequency-domain sub-channel in the frequency domain. Optionally, the frequency-domain sub-channels are obtained by dividing a carrier bandwidth in the frequency domain into [N/K] sub-channels in a manner that each group has k resource blocks (RBs) and according to frequency from low to high. In one slot, there may be a plurality of time-frequency resource units at different frequency-domain positions. These time-frequency resource units are used in a contention manner.

A contention resource group: configured to carry time-frequency resources of contention signals of respective terminals in the process of contending for a same time-frequency resource unit. The contention resource groups are in one-to-one correspondence with the time-frequency resource units. Each time-frequency resource unit corresponds to one contention resource group, and a time-domain position of the contention resource group is earlier than a time-domain position of the time-frequency resource unit. Each contention resource group includes at least two contention time-frequency resource units. Each contention time-frequency resource unit may occupy a very small amount of time-frequency resources. For example, each contention time-frequency resource unit is a resource unit (RE), or each contention time-frequency resource unit may be configured to transmit a specific signal sequence, or specific control information, or specific data, such as sidelink control information including data transmission scheduling information and receiving necessary information. "Specific" in the present disclosure refers to "protocol-agreed", wherein the specific signal sequence refers to one or more protocol-agreed signal sequences; the specific control information refers to protocol-agreed control information; and the specific data refers to protocol-agreed data.

Figure 2:
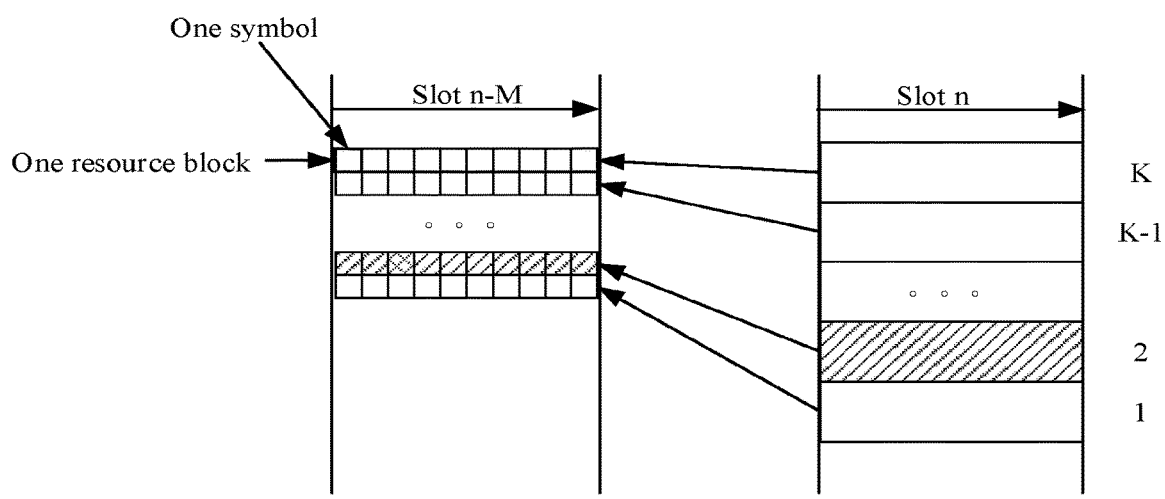
FIG. 2 is a schematic diagram showing a division of time-frequency resource units and contention resource groups according to an exemplary aspect of the present disclosure.

Exemplarily, FIG. 2 is a schematic diagram showing a division of time-frequency resource units and contention resource groups. As shown in FIG. 2, in a slot n, a time-frequency resource is divided into K time-frequency resource units, numbered from 1 to K In a slot n-M, each time-frequency resource unit corresponds to one contention resource group. For example, the time-frequency resource unit numbered 1 corresponds to the contention resource group in the last line, the time-frequency resource unit numbered 2 corresponds to the contention resource group in the penultimate line, the time-frequency resource unit numbered K−1 corresponds to the contention resource group in the second line, and the time-frequency resource unit numbered K corresponds to the contention resource group in the first line. Different contention resource groups corresponding to different time-frequency resource units in the same slot n are distributed at different frequency-domain positions.

Each contention resource group includes ten resource blocks, which occupy different symbols in the time domain and occupy the same RB position in the frequency domain.

It should be noted that the division diagram shown in FIG. 2 is only a schematic illustration, and does not constitute a limitation on the division manner of the time-frequency resource units and the contention resource groups.

In a 5G new radio (NR) system, the data sent by some V2X applications is non-periodically or randomly. For these data, the user equipment A cannot predict the interference and collision of the user equipment B when the user equipment B sends data next time based on the data sent by the user equipment B last time, such that the above solution cannot be used effectively.

Figure 3:
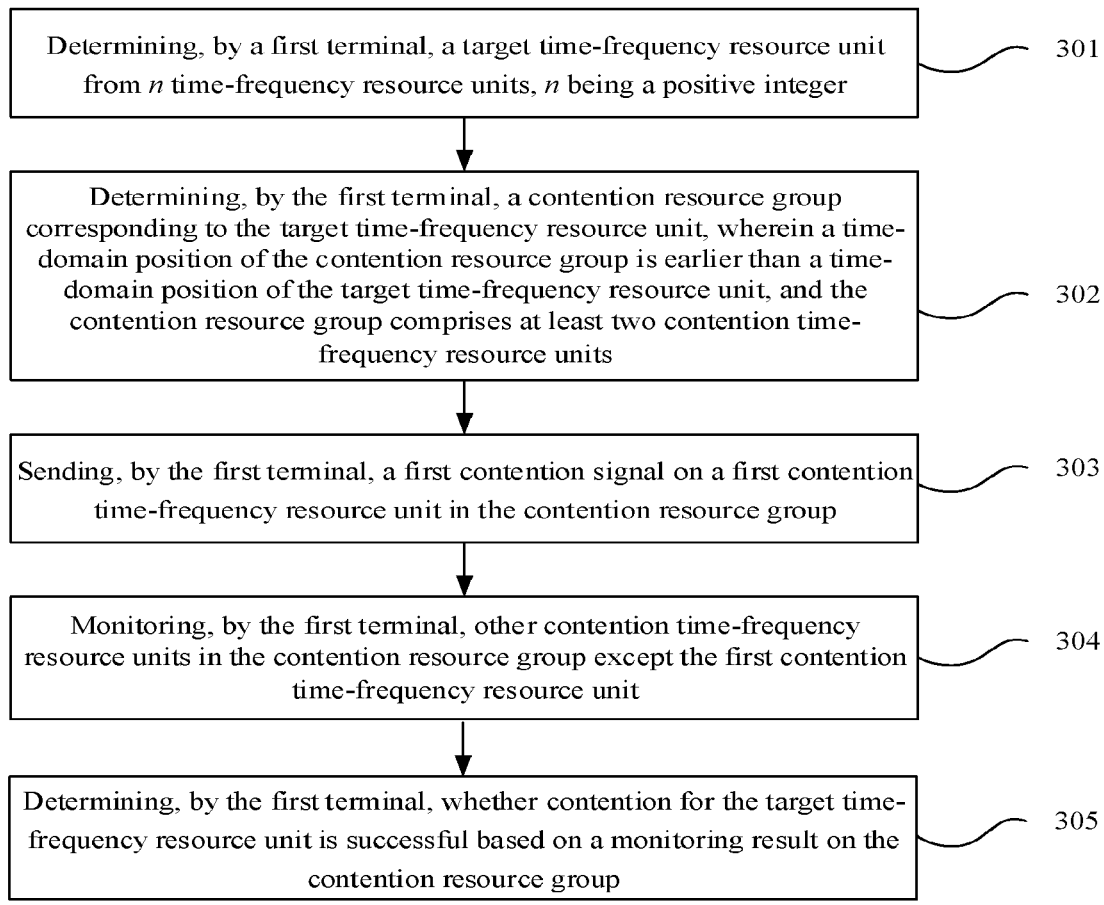
FIG. 3 shows a flowchart of a method for contending for a time-frequency resource for sidelink communication according to an exemplary aspect of the present disclosure.

FIG. 3 shows a flowchart of a method for contending for a time-frequency resource for sidelink communication according to an exemplary aspect of the present disclosure. As shown in FIG. 3, the method in the present aspect is applied to the communication system shown in FIG. 1 as an example for illustration. The method includes the following steps.

In step 301, a first terminal determines a target time-frequency resource unit from n time-frequency resource units, n being a positive integer.

During sidelink data transmission, the first terminal determines one or more target time-frequency resource units used in the current contention from the n time-frequency resource units allowed to be used.

Taking the number of the target time-frequency resource unit being one as an example, it is assumed that the target time-frequency resource unit is the time-frequency resource unit 2 in the slot n in FIG. 2.

In step 302, the first terminal determines a contention resource group corresponding to the target time-frequency resource unit, wherein a time-domain position of the contention resource group is earlier than a time-domain position of the target time-frequency resource unit, and the contention resource group includes at least two contention time-frequency resource units.

The time-domain position of the contention resource group is earlier than the time-domain position of the target time-frequency resource unit. For example, the contention resource group is in a slot n-M, and the target time-frequency resource unit is in the slot n.

The contention resource group includes at least two contention time-frequency resource units. The at least two contention time-frequency resource units in the same contention resource group have a same frequency-domain position but different time-domain positions.

Exemplarily, with reference to FIG. 2, the contention resource group corresponding to the time-frequency resource unit 2 refers to ten resource blocks in the slot n-M (a line of RBs with a left underlined background in FIG. 2).

In step 303, the first terminal sends a first contention signal on a first contention time-frequency resource unit in the contention resource group.

The first terminal selects any of the contention time-frequency resource units in the contention resource group as the first contention time-frequency resource unit, and sends the first contention signal on the first contention time-frequency resource unit. In some aspects, the first contention signal may be a specific signal sequence, specific control information, or specific data. Optionally, the first contention signal is sidelink control information including user data scheduling information and receiving necessary information.

The first contention signal is configured to indicate to other terminals that the first terminal is existed for contending for the use of this target time-frequency resource unit.

Exemplarily, with reference to FIG. 2, the first terminal may randomly select an RB in a third symbol (an RB with a right underlined background as shown in FIG. 2) from ten RBs in the contention resource group as the first contention time-frequency resource unit, and send a first contention signal on the RB in the third symbol.

In step 304, the first terminal monitors other contention time-frequency resource units in the contention resource group except the first contention time-frequency resource unit.

In step 305, the first terminal determines whether contention for the target time-frequency resource unit is successful based on a monitoring result on the contention resource group.

The first terminal monitors other contention time-frequency resource units in the contention resource group except the first contention time-frequency resource unit; and determines whether the contention for the target time-frequency resource unit is successful in response to the monitoring result on the contention resource group indicating that the first contention signal meets a contention success condition.

Exemplarily, the contention success condition includes but is not limited to any one of the following two cases.

In a first case, a second contention signal (one or more) is monitored on the other contention time-frequency resource units of the contention resource group, and time-domain positions of the contention time-frequency resource units respectively occupied by the first contention signal and the second contention signal satisfy a preset time-domain position relationship.

In a second case, a second contention signal is not monitored on the other contention time-frequency resource units in the contention resource group.

The first terminal may repeat the above steps and continue to contend for the target time-frequency resource unit in response to the monitoring result on the contention resource group indicating that the first contention signal does not meet the contention success condition.

In summary, according to the method for contending for the time-frequency resource for sidelink communication provided by the present aspect, the first terminal determines the target time-frequency resource unit from n time-frequency resource units, and the contention resource group corresponding to the target time-frequency resource unit; sends the first contention signal on the first contention time-frequency resource unit in the contention resource group; and determines whether contention for the target time-frequency resource unit is successful based on the monitoring result on the contention resource group. According to the method disclosed by the present disclosure, each contention process that is dynamically determined based on the contention resource group is ensured, and does not need to be predicted based on periodic information. Even if there is a terminal having a non-periodic data transmission requirement, dynamic contention can be performed when data needs to be transmitted, thereby avoiding a collision problem during sidelink communication.

In an optional aspect based on FIG. 3, the contention success condition includes any one of the following two cases.

In a first case, a second contention signal is monitored on a second contention time-frequency resource unit among the other contention time-frequency resource units, and time-domain positions of contention time-frequency resource units respectively occupied by the first contention signal and the second contention signal satisfy a preset time-domain position relationship.

Figure 4:
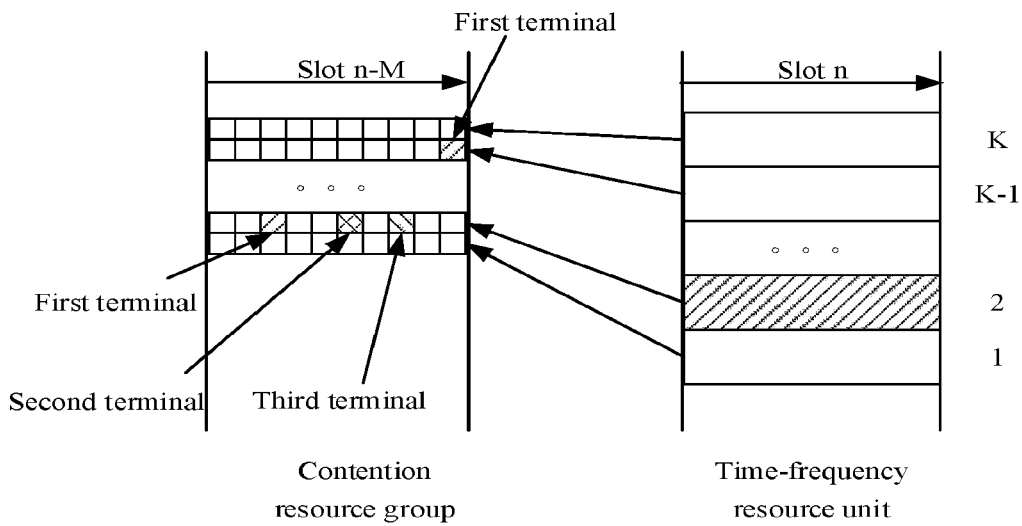
FIG. 4 is a schematic diagram showing a corresponding relationship between a target time-frequency resource unit and a contention resource group according to an exemplary aspect of the present disclosure.

In a possible aspect, the time-domain positions of the first contention time-frequency resource unit and the second contention time-frequency resource unit satisfying the preset time-domain position relationship includes: a time-domain position of the first contention time-frequency resource unit being earlier than a time-domain position of the second contention time-frequency resource unit. As shown in FIG. 4, for the target time-frequency resource unit 2, the corresponding contention resource group includes ten contention time-frequency resource units. If a time-domain position (a third symbol) of a contention time-frequency resource unit where a first contention signal randomly sent by the first terminal is located is earlier than a time-domain position (a sixth symbol) of the contention time-frequency resource unit where a second contention signal randomly sent by a second terminal is located, and earlier than a time-domain position (an eighth symbol) of a contention time-frequency resource unit where a third contention signal randomly sent by the third terminal is located, the first terminal determines that the contention for the target time-frequency resource unit 2 is successful, and accordingly, the second terminal and the third terminal give up selecting the target time-frequency resource unit 2. The first contention signal, the second contention signal, and the third contention signal may be specific signal sequences, specific control information or specific data. Optionally, the first contention signal, the second contention signal, or the third contention signal are sidelink control information including user data scheduling information and receiving necessary information.

Optionally, this condition is applicable to a scenario where there are at least two terminals contending for the transmission of a same time-frequency resource unit.

In a second case, a second contention signal is not monitored on the other contention time-frequency resource units.

If there is no other terminal to send the second contention signal in the contention resource group, that is, only the first terminal is contending for the use of the target time-frequency resource unit, it is also considered that the contention is successful.

Exemplarily, as shown in FIG. 4, in a contention resource group corresponding to a target time-frequency resource unit K, if there is only the first contention signal sent by the first terminal, and no other terminal sends a second contention signal in the contention resource group, it is also considered that the contention for the target time-frequency resource unit K by the first terminal is successful.

In summary, according to the contention success condition provided by the present aspect, when a plurality of terminals send contention signals in the same contention resource group, if a transmission position of the first contention signal is earlier than a transmission position of any second contention signal, the first terminal that sends the first contention signal determines that contention for a target time-frequency resource is successful, such that each terminal can determine whether the contention is successful when monitoring the first contention signal in the contention resource group, so as to execute subsequent logic, thereby saving the monitoring time required by the terminal, improving the contention efficiency of the terminal, and avoiding unnecessary energy consumption, power consumption and computing resource consumption.

The foregoing aspect is illustrated by taking one target time-frequency resource unit as an example. In other aspects, the first terminal may also contend for more than two target time-frequency resource units at the same time.

Figure 5:
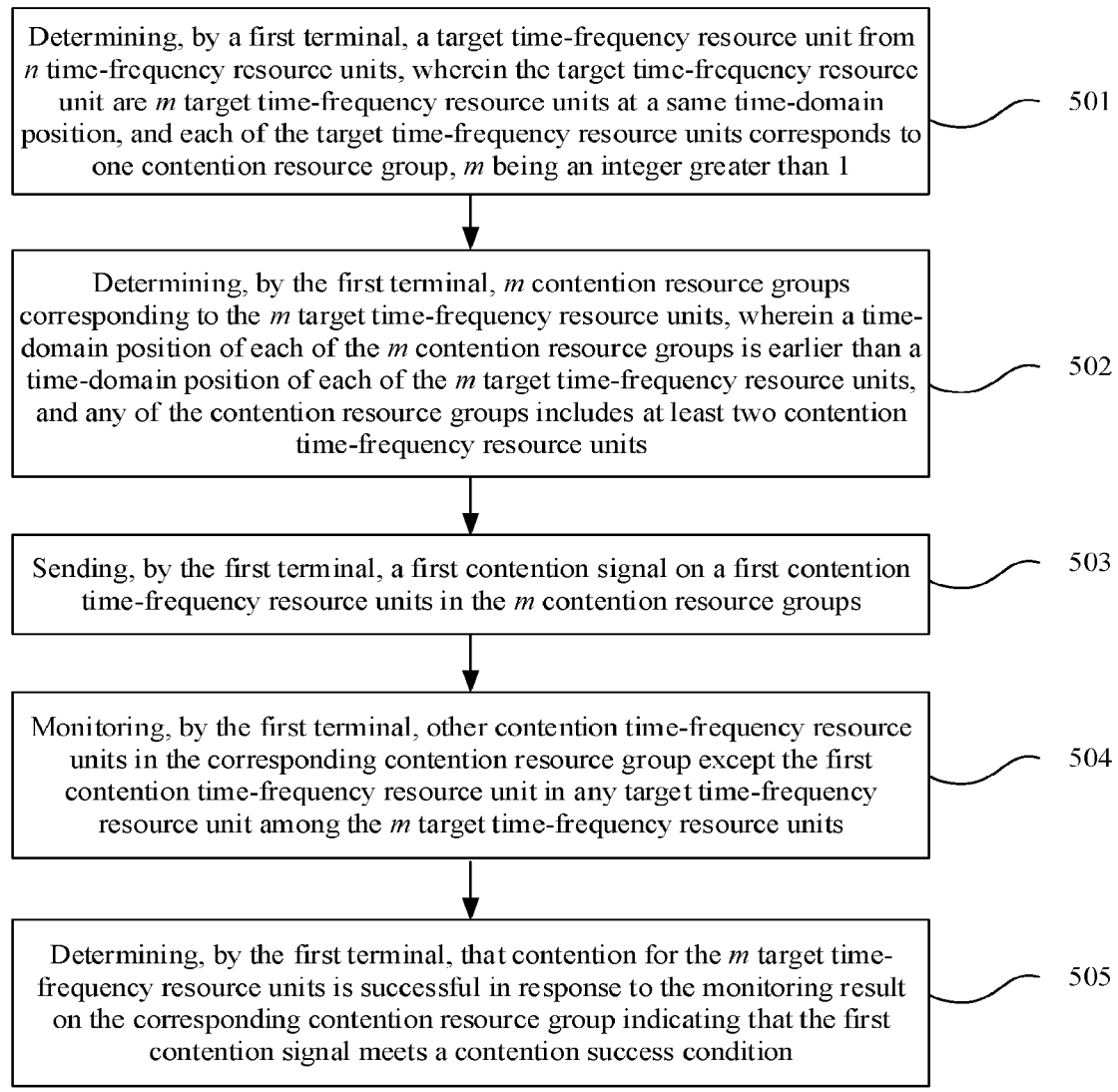
FIG. 5 shows a flowchart of a method for contending for a time-frequency resource for sidelink communication according to an exemplary aspect of the present disclosure.

In an optional aspect based on FIG. 3, FIG. 5 shows a flowchart of a method for contending for a time-frequency resource for sidelink communication according to an exemplary aspect of the present disclosure. The present aspect is illustrated by applying the method in the communication system shown in FIG. 1. The method includes the following steps.

In step 501, a first terminal determines m target time-frequency resource units from n time-frequency resource units, wherein the m target time-frequency resource units are m target time-frequency resource units at a same time-domain position, and each of the target time-frequency resource units corresponds to one contention resource group, n being a positive integer and m being an integer greater than 1.

Figure 6:
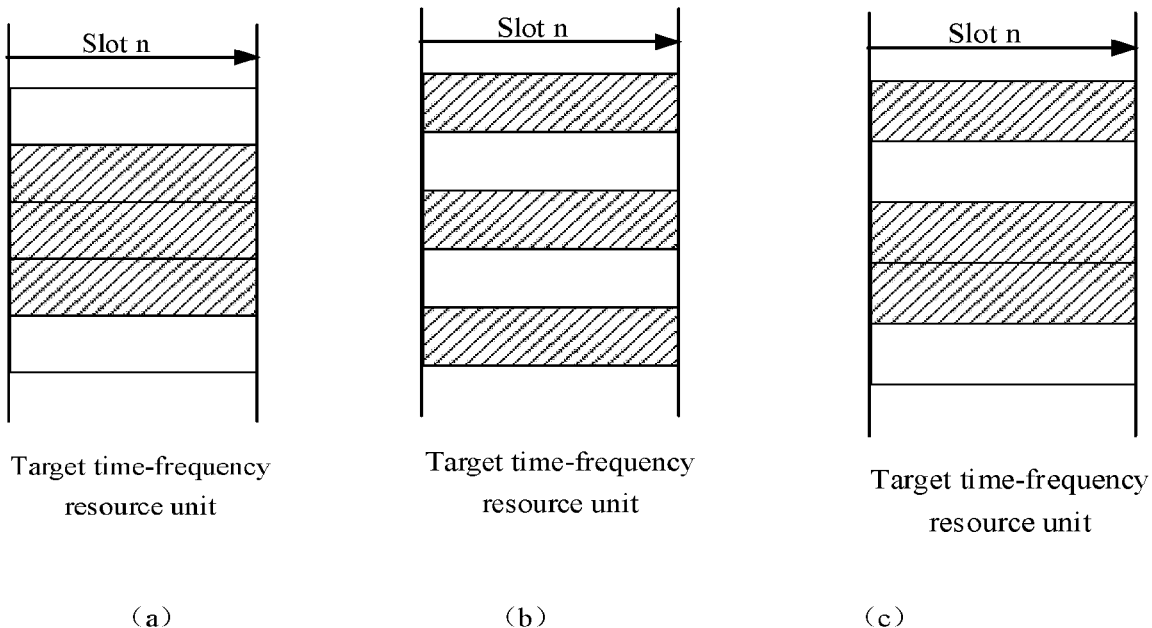
FIG. 6A is a schematic diagram showing a position of a target time-frequency resource unit according to an exemplary aspect of the present disclosure.
FIG. 6B is a schematic diagram showing a position of a target time-frequency resource unit according to an exemplary aspect of the present disclosure.
FIG. 6C is a schematic diagram showing a position of a target time-frequency resource unit according to an exemplary aspect of the present disclosure.

In some aspects, as shown in FIG. 6A, m target time-frequency resource units are a plurality of target time-frequency resource units having a same time-domain position and consecutive frequency-domain positions; or as shown in FIG. 6B, m target time-frequency resource units are a plurality of target time-frequency resource units having a same time-domain position and inconsecutive frequency-domain positions; or as shown in FIG. 6C, m target time-frequency resource units have a same time-domain position, but the frequency-domain positions of some of the target time-frequency resource units are consecutive, and the frequency-domain positions of the other part of the target time-frequency resource units are inconsecutive.

In step 502, the first terminal determines m contention resource groups corresponding to the m target time-frequency resource units, wherein a time-domain position of each of the m contention resource groups is earlier than a time-domain position of the corresponding target time-frequency resource unit, and any of the contention resource groups includes at least two contention time-frequency resource units.

Figure 7:
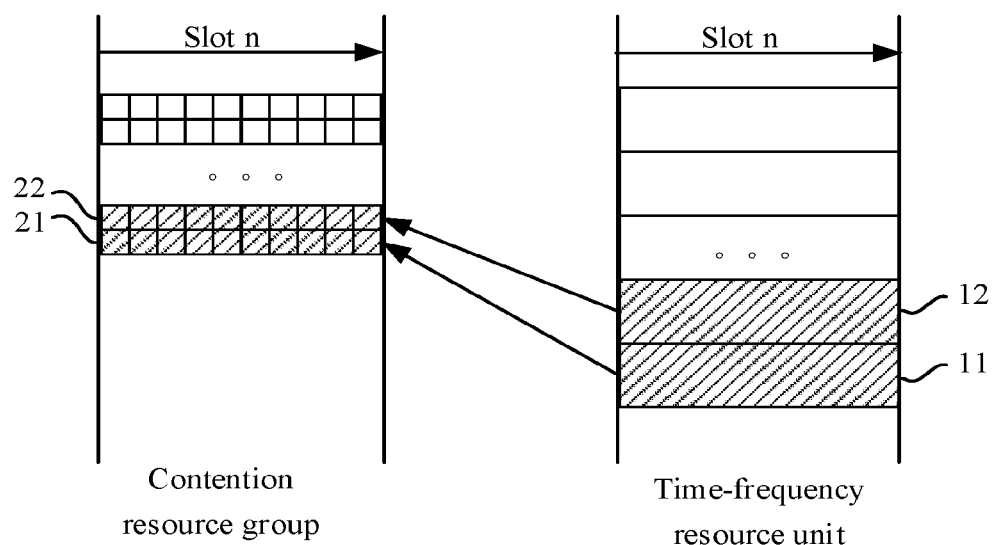
FIG. 7 is a schematic diagram showing a corresponding relationship between a target time-frequency resource unit and a contention resource group according to an exemplary aspect of the present disclosure.

In some aspects, as shown in FIG. 7, taking the m target time-frequency resource units as a plurality of target time-frequency resource units having a same time-domain positon and consecutive frequency-domain positions as an example, the first terminal determines a contention resource group 21 corresponding to a target time-frequency resource unit 11, and determines a contention resource group 22 corresponding to a target time-frequency resource unit 12. A time-domain position of each of the two contention resource groups is earlier than a time-domain position of the corresponding target time-frequency resource unit, and each contention resource group includes ten contention time-frequency resource units.

In step 503, the first terminal sends a first contention signal on a first contention time-frequency resource unit in the m contention resource groups.

For the plurality of determined contention resource groups, the first terminal arbitrarily selects one contention time-frequency resource unit in each contention resource group as a first contention time-frequency resource unit, and sends a first contention signal on each first contention time-frequency resource unit. In some aspects, the first contention signal may be a specific signal sequence, specific control information, or specific data. Optionally, the first contention signal is sidelink control information including user data scheduling information and receiving necessary information.

Optionally, the time-domain positions of the first contention time-frequency resource units of the m contention resource groups may be the same or different. That is, the first terminal randomly selects one contention time-frequency resource unit in each contention resource group, but the randomly selected time-domain positions may be the same or different.

Figure 8:
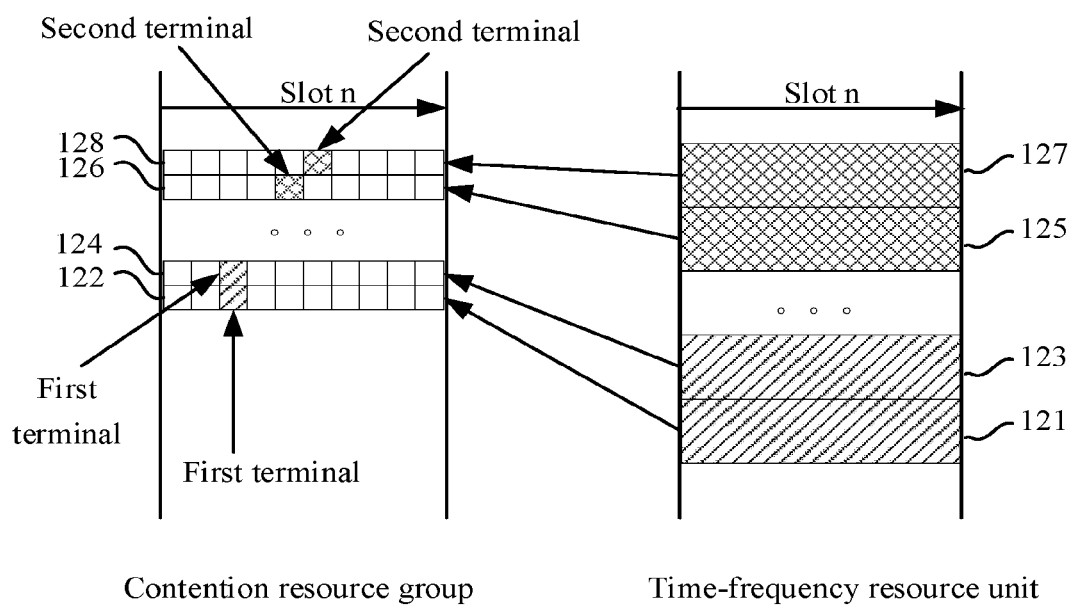
FIG. 8 is a schematic diagram of a time-domain position of a first contention signal according to an exemplary aspect of the present disclosure.

In some aspects, as shown in FIG. 8, the first terminal determines a target time-frequency resource unit 121 and another target time-frequency resource unit 123. The first terminal sends a first contention signal on a contention resource group 122 and another contention resource group 124 corresponding to the two target time-frequency resource units, wherein the time-domain positions of the first contention signal on the two contention resource groups are the same but the frequency-domain positions are different.

In some aspects, as shown in FIG. 8, a second terminal determines a target time-frequency resource unit 125 and another target time-frequency resource unit 127. The first terminal sends a first contention signal on a contention resource group 126 and another contention resource group 128 corresponding to the two target time-frequency resource units, wherein both the time-domain positions and the frequency-domain positions of the first contention signal on the two contention resource groups are different.

In the present aspect, the time-domain position of the first contention signal sent by the terminal on any contention resource group is not limited.

The first contention signal sent in an $i^{th}$ contention resource group is configured to indicate that there is a first terminal contending for the use of the corresponding $i^{th}$ target time-frequency resource unit.

In step 504, for any target time-frequency resource unit among the m target time-frequency resource units, the first terminal monitors other contention time-frequency resource units in the corresponding contention resource group except the first contention time-frequency resource unit.

In step 505, the first terminal determines that the contention for the m target time-frequency resource units is successful in response to the monitoring result on the corresponding contention resource group indicating that the first contention signal meets a contention success condition.

For the m target time-frequency resource units, the first terminal monitors m contention resource groups respectively corresponding to the m target time-frequency resource units, and determines that the contention for the m target time-frequency resource units is successful in response to the monitoring result on the m contention resource groups indicating that each m first contention signal meets the contention success condition.

In some aspects, as shown in FIG. 7, taking two target time-frequency resource units as an example, it is assumed that a monitoring result of the first terminal on a contention resource group 21 indicates that a first contention signal meets the contention success condition, and a monitoring result of the first terminal on a contention resource group 22 indicates that the first contention signal meets the contention success condition. Then, the first terminal determines that the contention for the target time-frequency resource units 11 and 12 is successful.

If at least one monitoring result on the contention resource group 21 and the contention resource group 22 indicates that the first contention signal does not meet the contention success condition, the first terminal determines that the contention for the target time-frequency resource units 11 and 12 is unsuccessful.

In summary, according to the method provided by the present aspect, with respect to a terminal that fails in contention for any target time-frequency resource unit among the plurality of target time-frequency resource units, it is determined that the simultaneous contention for the plurality of target time-frequency resource units is unsuccessful, which is more suitable for a scenario where the first terminal needs to transmit a large amount of data in the same time-domain position, thereby avoiding a problem that the target time-frequency resource unit for which the contention has been successful is wasted because the target time-frequency resource unit does not meet transmission requirements at this time.

Figure 9:
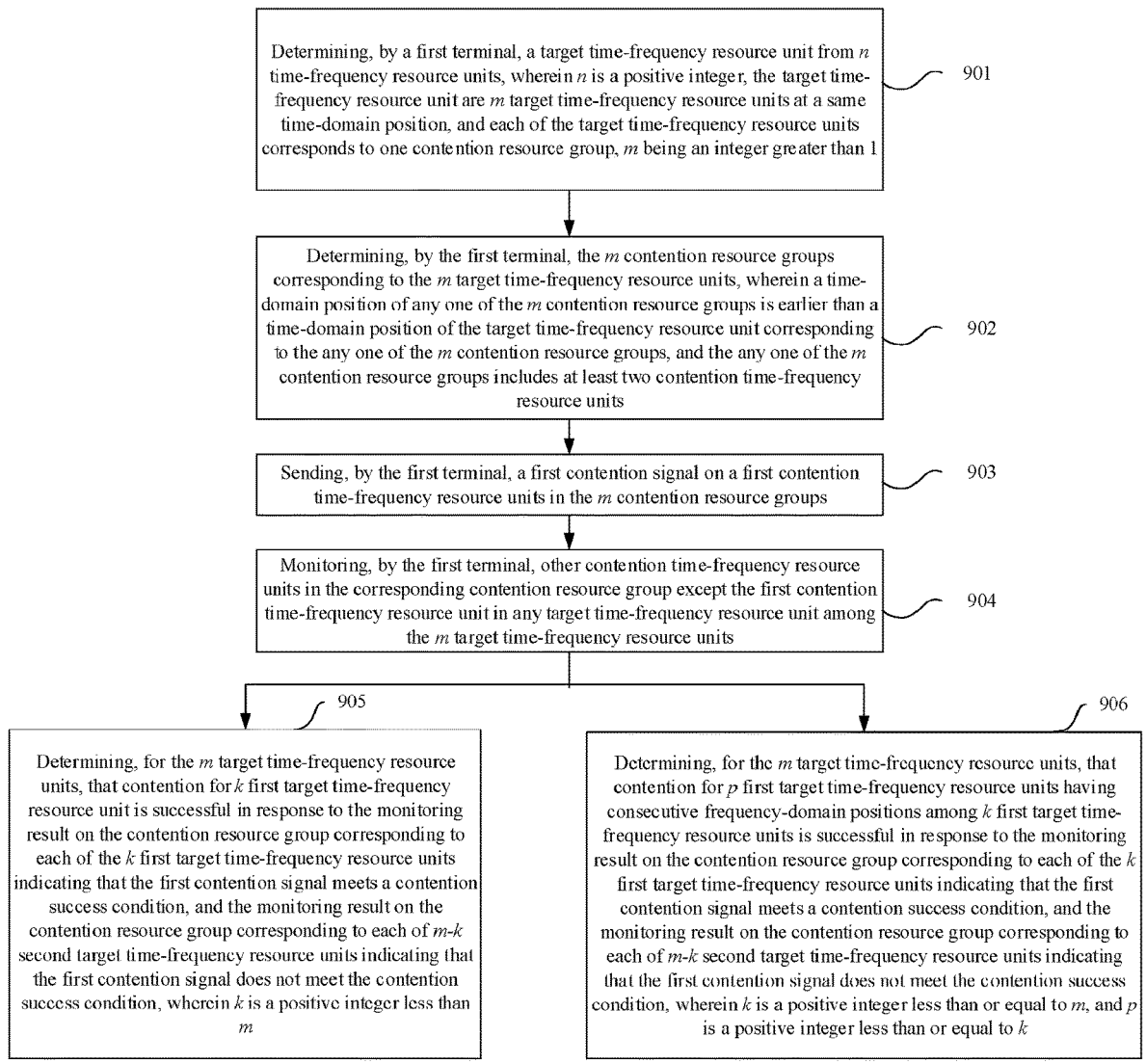
FIG. 9 shows a flowchart of a method for contending for a time-frequency resource for sidelink communication according to an exemplary aspect of the present disclosure.

In an optional aspect based on FIG. 3, FIG. 9 shows a flowchart of a method for contending for a time-frequency resource for sidelink communication according to an exemplary aspect of the present disclosure. In the present aspect, the method is applied to the communication system shown in FIG. 1 as an example for illustration. The method includes the following steps.

Steps 901 and 501, steps 902 and 502, steps 903 and 503, steps 904 and 504 have the same or similar content, and will not be described in detail in the present aspect.

In step 905, for the m target time-frequency resource units, the first terminal determines that contention for k first target time-frequency resource unit is successful in response to the monitoring result on the contention resource group corresponding to each of the k first target time-frequency resource units indicating that the first contention signal meets the contention success condition, and the monitoring result on the contention resource group corresponding to each of m-k second target time-frequency resource units indicating that the first contention signal does not meet the contention success condition, wherein k is a positive integer less than m.

In some aspects, the first contention signal and the second contention signal may be specific signal sequences, specific control information, or specific data. Optionally, the first contention signal is sidelink control information including user data scheduling information and receiving necessary information, or the second contention signal is sidelink control information including user data scheduling information and receiving necessary information.

Figure 10:
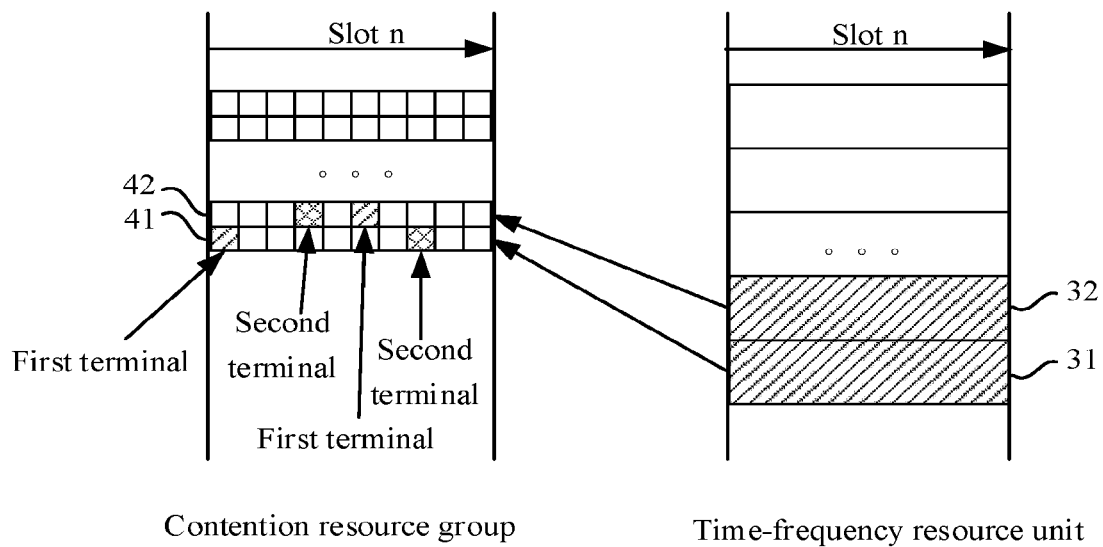
FIG. 10 is a schematic diagram showing a corresponding relationship between a target time-frequency resource unit and a contention resource group according to an exemplary aspect of the present disclosure.

In some aspects, taking two target time-frequency resource units as an example, as shown in FIG. 10, in a contention resource group 41, a time-domain position of a first contention signal sent by a first terminal is earlier than a time-domain position of a second contention signal sent by a second terminal, a monitoring result of a target time-frequency resource unit 31 on the corresponding contention resource group 41 indicates that the first contention signal sent by the first terminal meets a contention success condition; and in another contention resource group 41, a time-domain position of the second contention signal sent by the second terminal is earlier than a time-domain position of the first contention signal sent by the first terminal, a monitoring result of a target time-frequency resource unit 32 on the corresponding contention resource group 42 indicates that the first contention signal sent by the terminal does not meet the contention success condition. In this case, the first terminal determines that contention for the target time-frequency resource unit 31 is successful, and contention for the target time-frequency resource unit 32 is unsuccessful.

In step 906, for the m target time-frequency resource units, the first terminal determines that contention for p first target time-frequency resource units having consecutive frequency-domain positions among k first target time-frequency resource units is successful in response to the monitoring result on the contention resource group corresponding to each of the k first target time-frequency resource units indicating that the first contention signal meets the contention success condition, and the monitoring result on the contention resource group corresponding to each of m-k second target time-frequency resource units indicating that the first contention signal does not meet the contention success condition, wherein k is a positive integer less than or equal to m, and p is a positive integer less than or equal to k.

Figure 11:
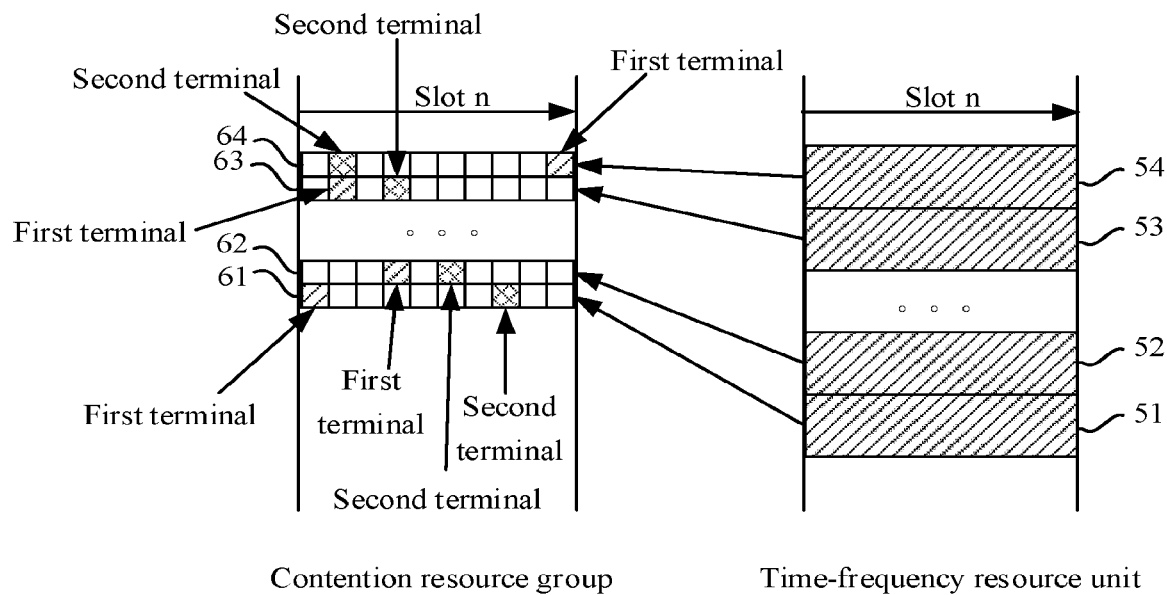
FIG. 11 is a schematic diagram showing a corresponding relationship between a target time-frequency resource unit and a contention resource group according to an exemplary aspect of the present disclosure.

In some aspects, taking four target time-frequency resource units as an example, as shown in FIG. 11, in a contention resource group 61, a time-domain position of a first contention signal sent by a first terminal is earlier than a time-domain position of a second contention signal sent by a second terminal; in another contention resource group 62, a time-domain position of the first contention signal sent by the first terminal is earlier than a time-domain position of the second contention signal sent by the second terminal; in yet another contention resource group 63, a time-domain position of the first contention signal sent by the first terminal is earlier than a time-domain position of the second contention signal sent by the second terminal; and in still yet another resource group 64, a time-domain position of the second contention signal sent by the second terminal is earlier than a time-domain position of the first contention signal sent by the first terminal. In this case, monitoring results of three target time-frequency resource units on the corresponding contention resource groups are that each first contention signal meets the contention success condition. In the four target time-frequency resource units, the target time-frequency resource units for which the first terminals contend successfully include a target time-frequency resource unit 51, a target time-frequency resource unit 52, and a target time-frequency resource unit 53. The first terminal selects the target time-frequency resource unit 51 and the target time-frequency resource unit 52 of which frequency-domain positions are consecutive, and determines that contention for the target time-frequency resource unit 51 and the target time-frequency resource unit 52 is successful.

The technical solution in step 906 is more suitable for usage scenarios where the terminal's sending capability is limited. For example, the terminal only supports a scenario where orthogonal frequency-division multiplexing (OFDM) signals are transmitted on a plurality of consecutive frequency-domain units.

The steps 905 and 906 are parallel steps. In the present aspect, the step 905 or step 906 can be optionally executed.

In summary, according to the method provided by the present aspect, for the m target time-frequency resource units, the first terminal determines that the contention for the k first target time-frequency resource units is successful in response to the monitoring result on the contention resource group corresponding to each of the k first target time-frequency resource units indicating that the first contention signal meets the contention success condition, and the monitoring result on the contention resource group corresponding to each of the m-k second target time-frequency resource units indicating that the first contention signal does not meet the contention success condition, such that the first terminal preferentially uses the first target time-frequency resource units for which the contention has been successful for transmission.

As another implementation, for the m target time-frequency resource units, the first terminal determines that contention for the p first target time-frequency resource units having consecutive frequency-domain positions among the k first target time-frequency resource units is successful in response to the monitoring result on the contention resource group corresponding to each of the k first target time-frequency resource units indicating that the first contention signal meets the contention success condition, and the monitoring result on the contention resource group corresponding to each of the m-k second target time-frequency resource units indicating that the first contention signal does not meet the contention success condition, wherein k is a positive integer less than or equal to m, and p is a positive integer less than or equal to k. Therefore, a problem that a plurality of target time-frequency resource units having inconsecutive frequency-domain positions for which the contention has been successful cannot be selected for data transmission due to the limitation of data transmission capability of a terminal.

In combination with the resource division method shown in FIG. 2 and the respective method aspects, the time-frequency resource units and the corresponding contention resource groups can be divided in a time-division multiplexing form or a frequency-division multiplexing form, which will not be limited in the present disclosure. However, a time-domain position of the contention resource group should be earlier than a time-domain position of the corresponding target time-frequency resource unit.

In some aspects, the target time-frequency resource unit and the corresponding contention resource group are at different frequency-domain positions, and a target time-frequency resource units at a same time-domain position are at different frequency-domain positions, and a contention resource groups respectively corresponding to the a target time-frequency resource units are at different frequency-domain positions, a being a positive integer less than or equal to m.

Figure 12:
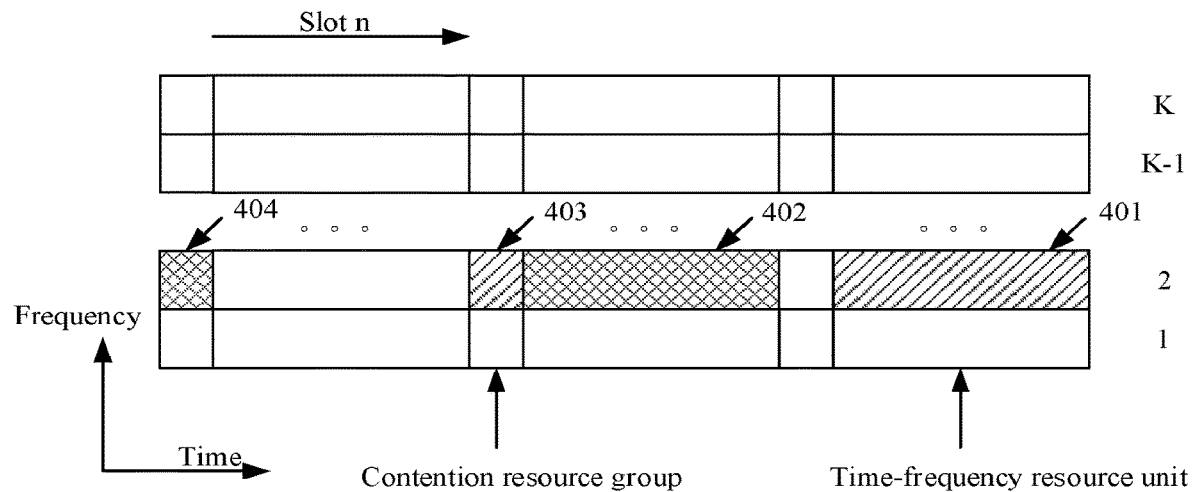
FIG. 12 is a schematic diagram showing a corresponding relationship between a time-frequency resource unit and a contention resource group according to an exemplary aspect of the present disclosure.

FIG. 12 shows a schematic diagram of a corresponding relationship between a time-frequency resource unit and a contention resource group. As shown in FIG. 12, a target time-frequency resource unit 401 in a frequency-domain sub-channel 2 corresponds to a contention resource group 403 in the frequency-domain sub-channel 2; and a target time-frequency resource unit 402 in the frequency-domain sub-channel 2 corresponds to a contention resource group 404 in the frequency-domain sub-channel 2. That is, the time-frequency resource units and the contention resource groups are divided in a time-division multiplexing form.

In some other aspects, the target time-frequency resource unit and the corresponding contention resource group are at a same frequency-domain positions, and a target time-frequency resource units at a same time-domain position are at different frequency-domain positions, and a contention resource groups respectively corresponding to the a target time-frequency resource units are at different frequency-domain positions.

Figure 13:
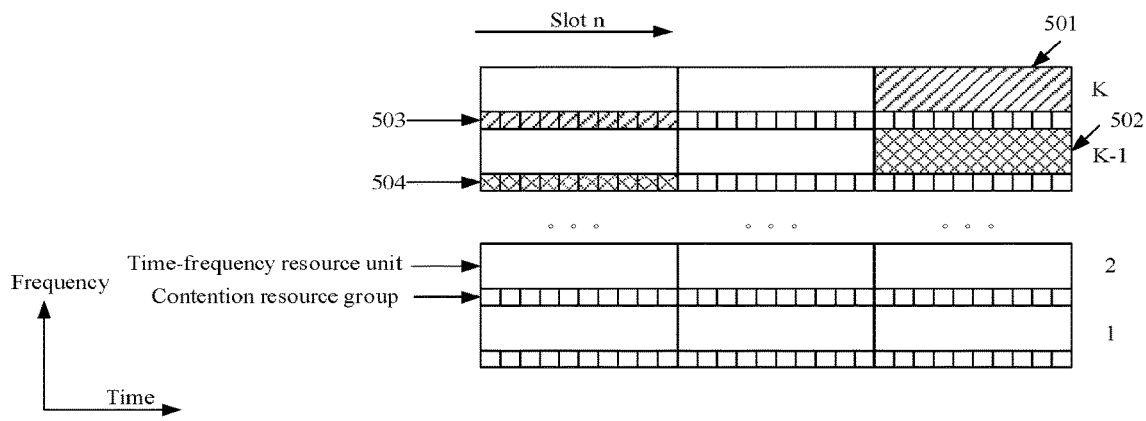
FIG. 13 is a schematic diagram showing a corresponding relationship between a time-frequency resource unit and a contention resource group according to an exemplary aspect of the present disclosure.
Figure 14:
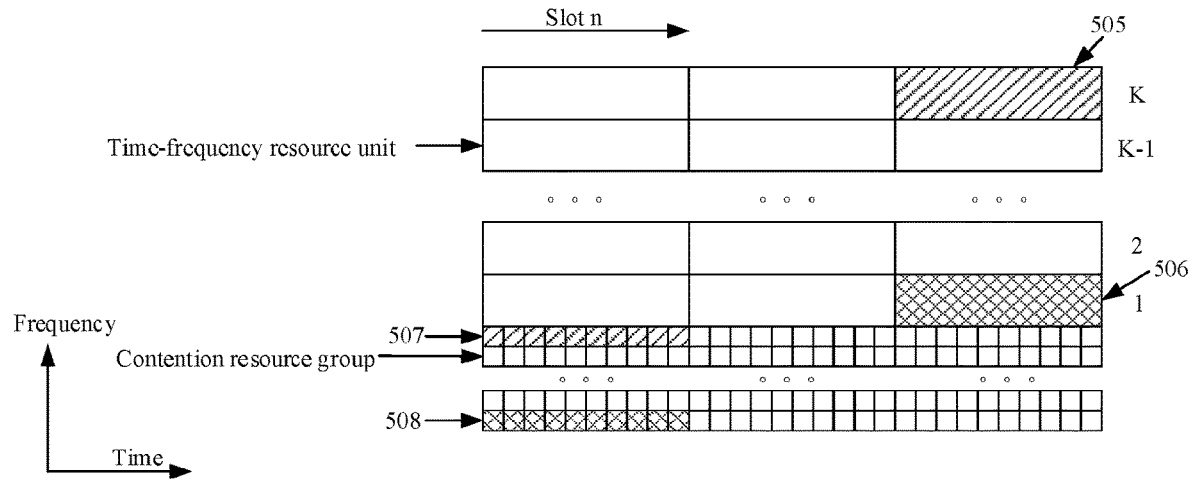
FIG. 14 is a schematic diagram showing a corresponding relationship between a time-frequency resource unit and a contention resource group according to an exemplary aspect of the present disclosure.

FIG. 13 shows a schematic diagram of a corresponding relationship between a time-frequency resource unit and a contention resource group. As shown in FIG. 13, a target time-frequency resource unit 501 in a frequency-domain sub-channel K corresponds to a contention resource group 503; and a target time-frequency resource unit 502 in a frequency-domain sub-channel K–1 corresponds to a contention resource group 504. In some possible aspects, as shown in FIG. 14, a target time-frequency resource unit 505 in the frequency-domain sub-channel K corresponds to a contention resource group 507; and a target time-frequency resource unit 506 in a frequency-domain sub-channel 1 corresponds to a contention resource group 508. That is, the time-frequency resource units and the contention resource groups are divided in a frequency-division multiplexing form.

Figure 15:
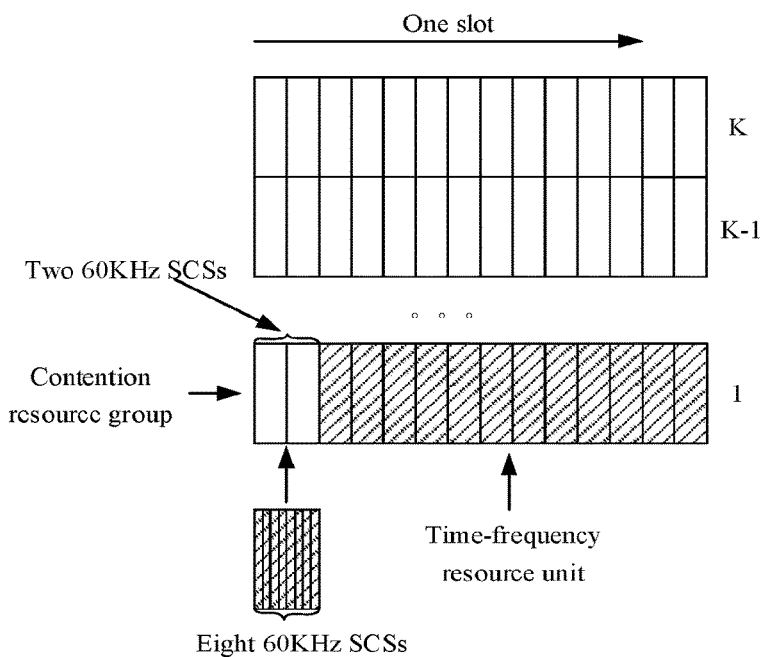
FIG. 15 is a schematic diagram showing another corresponding relationship between a time-frequency resource unit and a contention resource group according to an exemplary aspect of the present disclosure.

In still other possible aspects, FIG. 15 shows a schematic diagram of another corresponding relationship between a time-frequency resource unit and a contention resource group. In the frequency domain, the entire carrier bandwidth is divided into K frequency-domain sub-channels; and in the time domain, each slot includes 14 symbols. The first terminal determines the last 12 symbols as target time-frequency resource units, and determines the first 2 symbols in the time-domain position as contention resource groups corresponding to the target time-frequency resource units. Assuming that the first terminal uses a 30 KHz subcarrier spacing (SCS) to transmit data on the target time-frequency resource units, two 30 KHz SCS time-domain symbols can transmit eight 120 KH SCS time-domain symbols. In this case, each contention resource group includes eight contention time-frequency resource units.

The following is an apparatus aspect of the present disclosure, which can be configured to perform the method aspects of the present disclosure. The details that are not disclosed in the apparatus aspect of the present disclosure can refer to the method aspect of the present disclosure.

Figure 16:
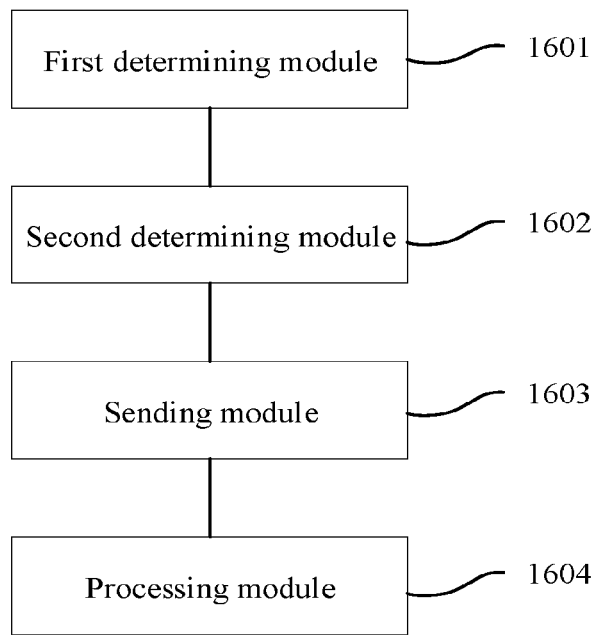
FIG. 16 shows a block diagram of an apparatus for contending for a time-frequency resource for sidelink communication according to an exemplary aspect of the present disclosure.

FIG. 16 is a block diagram of an apparatus for a time-frequency resource for sidelink communication according to an exemplary aspect. The apparatus may be implemented by software, hardware or a combination of the both into a part of or whole of a terminal for contending for a time-frequency resource for sidelink communication. The apparatus may include a first determining module 1601, a second determining module 1601, a sending module 1603, and a processing module 1604.

The first determining module 1601 is configured to determine a target time-frequency resource unit from n time-frequency resource units, n being a positive integer.

The second determining module 1602 is configured to determine a contention resource group corresponding to the target time-frequency resource unit, wherein a time-domain position of the contention resource group is earlier than a time-domain position of the target time-frequency resource unit, and the contention resource group comprises at least two contention time-frequency resource units.

The sending module 1603 is configured to send a first contention signal on a first contention time-frequency resource unit in the contention resource group.

In some aspects, the first contention signal may be a specific signal sequence, specific control information, or specific data. Optionally, the first contention signal is sidelink control information including user data scheduling information and receiving necessary information.

The processing module 1604 is configured to monitor other contention time-frequency resource units in the contention resource group except the first contention time-frequency resource unit; and determine whether the contention for the target time-frequency resource unit is successful based on a monitoring result on the contention resource group.

In some aspects, the processing module 1604 is configured to determine that the contention for the target time-frequency resource unit is successful in response to the monitoring result on the contention resource group indicating that the first contention signal meets a contention success condition.

In some aspects, the target time-frequency resource unit are m target time-frequency resource units at a same time-domain position, and each of the target time-frequency resource units corresponds to one contention resource group, m being an integer greater than 1; and the processing module 1604 is configured to determine that contention for the m target time-frequency resource units is successful in response to the monitoring result on the contention resource group corresponding to any target time-frequency resource unit among the m target time-frequency resource units indicating that the first contention signal meets the contention success condition.

In some aspects, the target time-frequency resource unit are m target time-frequency resource units at the same time-domain position, and each of the target time-frequency resource units corresponds to one contention resource group, m being an integer greater than 1; and the processing module 1604 is configured to determine, for the m target time-frequency resource units, that contention for k first target time-frequency resource units is successful in response to the monitoring result on the contention resource group corresponding to each of the k first target time-frequency resource units indicating that the first contention signal meets a contention success condition, and the monitoring result on the contention resource group corresponding to each of m-k second target time-frequency resource units indicating that the first contention signal does not meet the contention success condition, wherein k is a positive integer less than m.

In some aspects, the target time-frequency resource unit are m target time-frequency resource units at the same time-domain position and having consecutive frequency-domain positions, and each of the target time-frequency resource units corresponds to one contention resource group, m being an integer greater than 1; and the processing module 1604 is configured to determine, for the m target time-frequency resource units, that contention for p first target time-frequency resource units having consecutive frequency-domain positions among k first target time-frequency resource units is successful in response to the monitoring result on the contention resource group corresponding to each of the k first target time-frequency resource units indicating that the first contention signal meets a contention success condition, and the monitoring result on the contention resource group corresponding to each of m-k second target time-frequency resource units indicating that the first contention signal does not meet the contention success condition, wherein k is a positive integer less than or equal to m, and p is a positive integer less than or equal to k.

In some aspects, the contention success condition includes:

a second contention signal being monitored on a second contention time-frequency resource unit among the other contention time-frequency resource units, and the contention time-frequency resource units respectively occupied by the first contention signal and the second contention signal satisfying a preset time-domain position relationship; and/or a second contention signal being not monitored on the other contention time-frequency resource units.

In some aspects, the at least two contention time-frequency resource units in a same contention resource group have a same frequency-domain position but different time-domain positions; and the preset time-domain position relationship includes:

a time-domain position of the first contention time-frequency resource unit being earlier than a time-domain position of the second contention time-frequency resource unit.

In some aspects, the m target time-frequency resource units include an $i^{th}$ target time-frequency resource unit and a $j^{th}$ target time-frequency resource unit, wherein the $i^{th}$ target time-frequency resource unit corresponds to an $i^{th}$ contention resource group, and the $j^{th}$ target time-frequency resource unit corresponds to a $j^{th}$ contention resource group, i and j being positive integers less than or equal to m;

wherein first contention time-frequency resource units respectively corresponding to a first contention signal in the $i^{th}$ contention resource group and a first contention signal in the $j^{th}$ contention resource group have a same time-domain position.

In some aspects, the target time-frequency resource unit and the corresponding contention resource group are at different frequency-domain positions, and a target time-frequency resource units at a same time-domain position are at different frequency-domain positions, and a contention resource groups respectively corresponding to the a target time-frequency resource units are at different frequency-domain positions, a being a positive integer less than or equal to m; or the target time-frequency resource unit and the corresponding contention resource group are at a same frequency-domain position, and a target time-frequency resource units at a same time-domain position are at different frequency-domain positions, and a contention resource groups respectively corresponding to the a target time-frequency resource units are at different frequency-domain positions.

In summary, according to the apparatus for contending for the time-frequency resource for sidelink communication according to the present aspect, the first terminal determines the target time-frequency resource unit from the n time-frequency resource units, and the contention resource group corresponding to the target time-frequency resource unit, sends the first contention signal on the first contention time-frequency resource unit in the contention resource group, and determines whether the contention for the target time-frequency resource unit is successful based on the monitoring result on the contention resource group. According to the apparatus provided by the present disclosure, each contention process that is dynamically determined based on the contention resource group is ensured, and does not need to predicted based on periodic information. Even if there is a terminal having a non-periodic data transmission requirement, dynamic contention can be performed when data needs to be transmitted, thereby avoiding a collision problem during sidelink communication.

Figure 17:
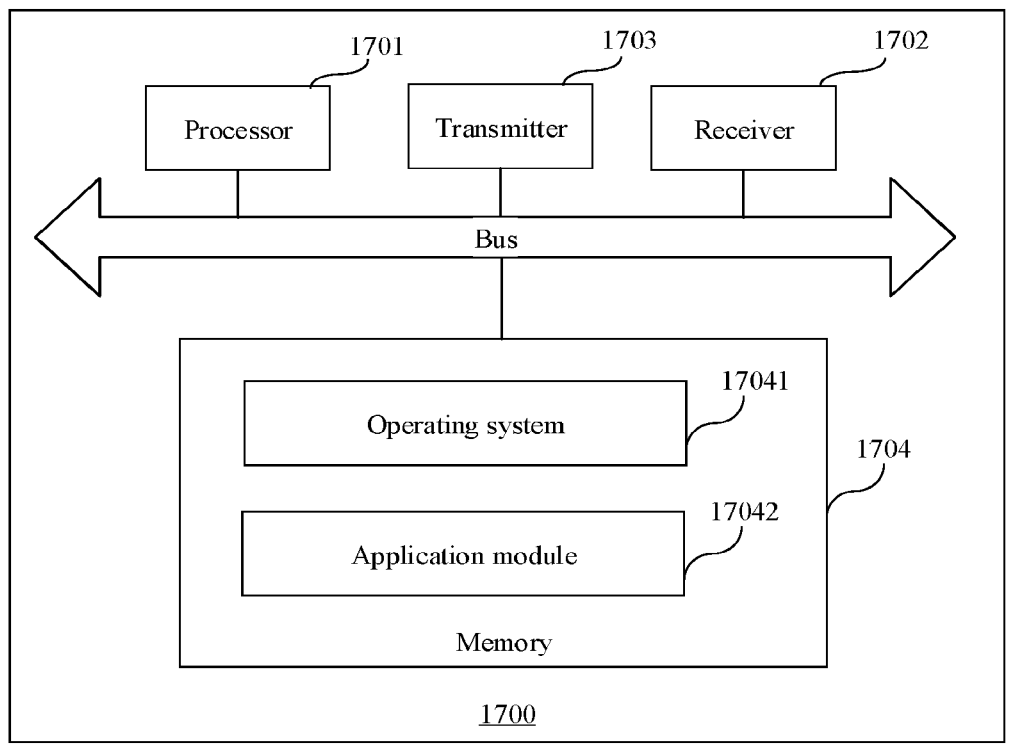
FIG. 17 is a block diagram of a terminal according to an exemplary aspect of the present disclosure.

FIG. 17 is a block diagram of a terminal according to an exemplary aspect. For example, the terminal 1700 may be a first terminal or a second terminal. As shown in FIG. 17, the terminal 1700 may include a processor 1701, a receiver 1702, a transmitter 1703, and a memory 1704. The receiver 1702, the transmitter 1703 and the memory 1704 are connected to the processor 1701 respectively via a bus.

The processor 1701 includes one or more processing cores. The processor 1701 performs the method for contending for the time-frequency resource for sidelink communication according to the aspect of the present disclosure executed by the terminal by running software programs and modules. The memory 1704 may be configured to store software programs and modules therein. Specifically, the memory 1704 may be configured to store an operating system 17041, and an application module 17042 required for at least one function. The receiver 1702 is configured to receive communication data sent by other devices. The transmitter 1703 is configured to send communication data to other devices.

In an exemplary aspect, a computer-readable storage medium is provided, which is a non-volatile computer-readable storage medium. The computer-readable storage medium stores at least one computer program therein. The stored computer program, when being executed by a processing component, can perform the method for contending for the time-frequency resource for sidelink communication according to the above aspects of the present disclosure.

An aspect of the present disclosure provides a computer program product with instructions stored therein. The instructions, when running on a computer, cause the computer to perform the method for contending for the time-frequency resource for sidelink communication according to the aspects of the present disclosure.

An aspect of the present disclosure provides a chip. The chip includes a programmable logic circuit and/or program instruction. The chip can perform the method for contending for the time-frequency resource for sidelink communication according to the aspects of the present disclosure when in operation.

It is noted that the various modules, sub-modules, units, and components in the present disclosure can be implemented using any suitable technology. For example, a module may be implemented using circuitry, such as an integrated circuit (IC). As another example, a module may be implemented as a processing circuit executing software instructions.

It should be understood that the term "a plurality of" herein refers to two or more. "And/or" herein describes the correspondence of the corresponding objects, indicating three kinds of relationship. For example, A and/or B, may be expressed as: A exists alone, A and B exist simultaneously, B exists alone. The character "/" generally indicates an "or" relationship between the contextual objects.

After considering the specification and practicing the present disclosure, those skilled in the art will easily think of other aspects of the present disclosure. The present disclosure is intended to cover any variations, uses, or adaptations of the present disclosure. These variations, uses, or adaptive changes follow the general principles of the present disclosure and include common knowledge or conventional technical means in the technical field not disclosed in the present disclosure. The description and the aspects are only regarded as exemplary, and the true scope and spirit of the present disclosure are defined by the appended claims.

It should be understood that the present disclosure is not limited to the precise structure described above and shown in the drawings, and various modifications and changes may be made without departing from its scope. The scope of the present disclosure is only limited by the appended claims.

What is claimed is:

1. A method for contending for a time-frequency resource for sidelink communication, the method being performed by a terminal, the method comprising:
    determining m target time-frequency resource units at a same time-domain position and having consecutive frequency-domain positions from n time-frequency resource units, wherein each of the m target time-frequency resource units corresponds to one contention resource group, m is an integer greater than 1, and n is a positive integer greater than or equal to m;
    determining, for each of the m target time-frequency resource units, a contention resource group corresponding to the target time-frequency resource unit, wherein a time-domain position of the contention resource group is earlier than a time-domain position of the target time-frequency resource unit, and the contention resource group comprises at least two contention time-frequency resource units; sending a first contention signal on a first contention time-frequency resource unit in the contention resource group; and monitoring other contention time-frequency resource units in the contention resource group except the first contention time-frequency resource unit; and
    determining, for the m target time-frequency resource units, that contention for p first target time-frequency resource units having consecutive frequency-domain positions among k first target time-frequency resource units is successful in response to the monitoring result on the contention resource group corresponding to each of the k first target time-frequency resource units indicating that the first contention signal meets a contention success condition, and the monitoring result on the contention resource group corresponding to each of m-k second target time-frequency resource units indicating that the first contention signal does not meet the contention success condition, wherein k is a positive integer less than or equal to m. and p is a positive integer less than or equal to k.

2. The method according to claim 1, further comprising:
    determining that the contention for the target time-frequency resource unit is successful in response to the monitoring result on the contention resource group indicating that the first contention signal meets a contention success condition.

3. The method according to claim 2, wherein the contention success condition comprises:
    a second contention signal being monitored on a second contention time-frequency resource unit among the other contention time-frequency resource units, and time-domain positions of contention time-frequency resource units respectively occupied by the first contention signal and the second contention signal satisfying a preset time-domain position relationship; and/or
    a second contention signal being not monitored on the other contention time-frequency resource units.

4. The method according to claim 3, wherein
    the at least two contention time-frequency resource units in a same contention resource group have a same frequency-domain position but different time-domain positions, and
    wherein the preset time-domain position relationship comprises:
        a time-domain position of the first contention time-frequency resource unit being earlier than a time-domain position of the second contention time-frequency resource unit.

5. The method according to claim 1, further comprising:
    determining that contention for the m target time-frequency resource units is successful in response to the monitoring result on the contention resource group corresponding to any target time-frequency resource unit among the m target time-frequency resource units indicating that the first contention signal meets a contention success condition.

6. The method according to claim 5, wherein the m target time-frequency resource units comprise an $i^{th}$ target time-frequency resource unit and a $j^{th}$ target time-frequency resource unit, wherein the $i^{th}$ target time-frequency resource unit corresponds to an $i^{th}$ contention resource group, and the $j^{th}$ target time-frequency resource unit corresponds to a $j^{th}$ contention resource group, i and j being positive integers less than or equal to m, and
    wherein first contention time-frequency resource units respectively corresponding to a first contention signal in the $i^{th}$ contention resource group and a first contention signal in the $j^{th}$ contention resource group have a same time-domain position.

7. The method according to claim 1, further comprising:
    determining, for the m target time-frequency resource units, that contention for k first target time-frequency resource units is successful in response to the monitoring result on the contention resource group corresponding to each of the k first target time-frequency resource units indicating that the first contention signal meets a contention success condition, and the monitoring result on the contention resource group corresponding to each of m-k second target time-frequency resource units indicating that the first contention signal does not meet the contention success condition, wherein k is a positive integer less than m.

8. The method according to claim 1, wherein:
    the target time-frequency resource unit and the corresponding contention resource group are at different frequency-domain positions, a target time-frequency resource units at a same time-domain position are at different frequency-domain positions, and a contention resource groups respectively corresponding to the a target time-frequency resource units are at different frequency-domain positions, a being a positive integer less than or equal to m; or
    the target time-frequency resource unit and the corresponding contention resource group are at a same frequency-domain position, a target time-frequency resource units at a same time-domain position are at different frequency-domain positions, and a contention resource groups respectively corresponding to the a target time-frequency resource units are at different frequency-domain positions.

9. An apparatus for contending for a time-frequency resource for sidelink communication, comprising:
a processor; and
a memory for storing at least one instruction executable by the processor,
wherein, when the at least one instruction is executed by the processor, the processor performs a method for contending for a time-frequency resource for sidelink communication, the method comprising:
determining m target time-frequency resource units at a same time-domain position and having consecutive frequency-domain positions from n time-frequency resource units, wherein each of the m target time-frequency resource units corresponds to one contention resource group, m is an integer greater than 1, and n is a positive integer greater than or equal to m;
determining, for each of the m target time-frequency resource units, a contention resource group corresponding to the target time-frequency resource unit, wherein a time-domain position of the contention resource group is earlier than a time-domain position of the target time-frequency resource unit, and the contention resource group comprises at least two contention time-frequency resource units; sending a first contention signal on a first contention time-frequency resource unit in the contention resource group; and monitoring other contention time-frequency resource units in the contention resource group except the first contention time-frequency resource unit; and
determining, for the m target time-frequency resource units, that contention for p first target time-frequency resource units having consecutive frequency-domain positions among k first target time-frequency resource units is successful in response to the monitoring result on the contention resource group corresponding to each of the k first target time-frequency resource units indicating that the first contention signal meets a contention success condition, and the monitoring result on the contention resource group corresponding to each of m-k second target time-frequency resource units indicating that the first contention signal does not meet the contention success condition, wherein k is a positive integer less than or equal to m. and p is a positive integer less than or equal to k.

10. The apparatus according to claim 9, wherein the method further comprises:
determining that the contention for the target time-frequency resource unit is successful in response to the monitoring result on the contention resource group indicating that the first contention signal meets a contention success condition.

11. The apparatus according to claim 10, wherein the contention success condition comprises:
a second contention signal being monitored on a second contention time-frequency resource unit among the other contention time-frequency resource units, and time-domain positions of contention time-frequency resource units respectively occupied by the first contention signal and the second contention signal satisfying a preset time-domain position relationship; and/or
a second contention signal being not monitored on the other contention time-frequency resource units.

12. The apparatus according to claim 11, wherein
the at least two contention time-frequency resource units in a same contention resource group have a same frequency-domain position but different time-domain positions, and
wherein the preset time-domain position relationship comprises:
a time-domain position of the first contention time-frequency resource unit being earlier than a time-domain position of the second contention time-frequency resource unit.

13. The apparatus according to claim 9, wherein the method further comprises:
determining that contention for the m target time-frequency resource units is successful in response to the monitoring result on the contention resource group corresponding to any target time-frequency resource unit among the m target time-frequency resource units indicating that the first contention signal meets a contention success condition.

14. The apparatus according to claim 13, wherein the m target time-frequency resource units comprise an $i^{th}$ target time-frequency resource unit and a $j^{th}$ target time-frequency resource unit, wherein the $i^{th}$ target time-frequency resource unit corresponds to an $i^{th}$ contention resource group, and the $j^{th}$ target time-frequency resource unit corresponds to a $j^{th}$ contention resource group, i and j being positive integers less than or equal to m, and
wherein first contention time-frequency resource units respectively corresponding to a first contention signal in the $i^{th}$ contention resource group and a first contention signal in the $j^{th}$ contention resource group have a same time-domain position.

15. The apparatus according to claim 9, wherein the method further comprises:
determining, for the m target time-frequency resource units, that contention for k first target time-frequency resource units is successful in response to the monitoring result on the contention resource group corresponding to each of the k first target time-frequency resource units indicating that the first contention signal meets a contention success condition, and the monitoring result on the contention resource group corresponding to each of m-k second target time-frequency resource units indicating that the first contention signal does not meet the contention success condition, wherein k is a positive integer less than m.

16. The apparatus according to claim 9, wherein:
the target time-frequency resource unit and the corresponding contention resource group are at different frequency-domain positions, a target time-frequency resource units at a same time-domain position are at different frequency-domain positions, and a contention resource groups respectively corresponding to the a target time-frequency resource units are at different frequency-domain positions, a being a positive integer less than or equal to m; or
the target time-frequency resource unit and the corresponding contention resource group are at a same frequency-domain position, and a target time-frequency resource units at a same time-domain position are at different frequency-domain positions, and a contention resource groups respectively corresponding to the a target time-frequency resource units are at different frequency-domain positions.

17. A terminal, comprising:
a processor;

a transceiver communicably connected to the processor; and a memory configured to store at least one instruction executable by the processor, wherein the processor, when loading and executing the at least one executable instruction, is caused to perform the method for contending for the time-frequency resource for sidelink communication as defined in claim 1.

18. A non-transitory computer-readable storage medium storing at least one instruction, at least one program, at least one code set, or at least one instruction set, wherein the at least one instruction, the at least one program, the at least one code set, or the at least one instruction set, when loaded and executed by a processor of a terminal, causes the terminal to perform the method for contending for the time-frequency resource for sidelink communication as defined in claim 1.

* * * * *